Figure 1:
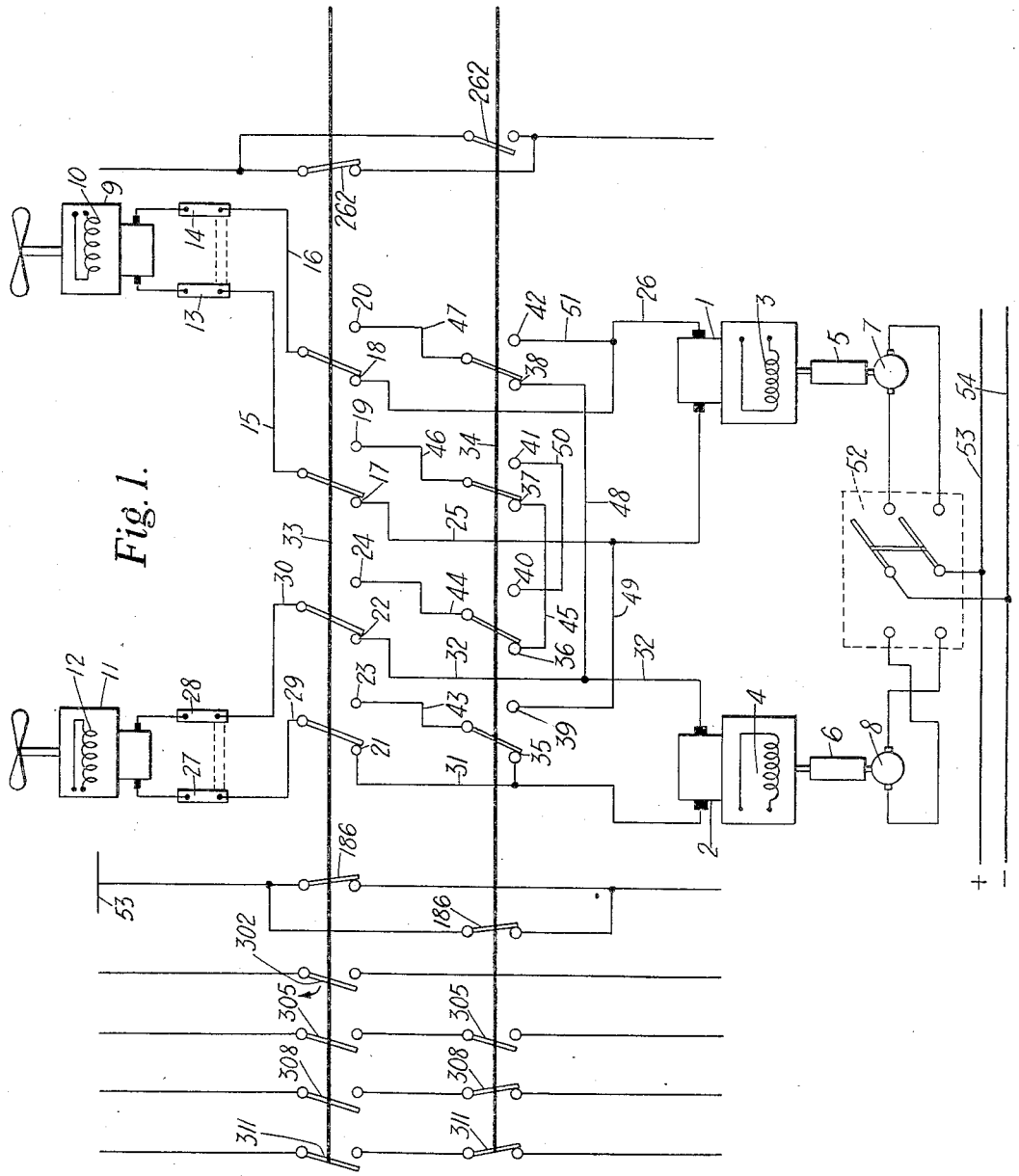

July 30, 1935.  H. J. COATES  2,009,576
ELECTRIC SHIP PROPULSION SYSTEM
Filed Dec. 23, 1933   3 Sheets-Sheet 3

INVENTOR
Herbert J. Coates
BY
ATTORNEY

Patented July 30, 1935

2,009,576

UNITED STATES PATENT OFFICE 2,009,576

ELECTRIC SHIP PROPULSION SYSTEM

Heerbert John Coates, Erdington, Birmingham, England, assignor to The General Electric Company Limited, London, England Application December 23, 1933, Serial No. 703,823
In Great Britain December 23, 1932

8 Claims. (Cl. 172—8)

This invention relates to bridge or remote electric control arrangements for electric ship propulsion systems of the kind having motors which are respectively coupled to port and starboard propellers and which are arranged to be fed from the same generator, speed control being effected by regulation of the excitation or/and speed of the generator, one object being the provision of a simple and reliable remote control arrangement the operation of which calls for no particular effort or care on the part of the officer on watch. Ship propulsion systems of the kind in question are frequently so arranged that the port and starboard motors are at times separately supplied with power from port and starboard generators and at other times are supplied with power from a common generator, either the port generator or the starboard generator, and an object of the invention is the provision of a control arrangement for exerting control both when the motors are supplied from a common generator or when the motors are supplied from their individual generators.

In a bridge or remote electrical control arrangement for an electric ship propulsion system having motors which are respectively coupled to port and starboard propellers and which are arranged to be fed from the same generator, speed control of a motor being effected by regulation of the excitation or/and speed of a generator supplying the motor with power, according to the present invention port and starboard controllers are arranged with ahead and astern positions and when one of the controllers is moved from an operative position to a reverse position, for example, from an ahead to an astern position, common speed control means is controlled by the said controller at least until the means has moved to an initial or off position.

In an electric control arrangement according to the invention, moreover, port and starboard controllers are arranged with ahead and astern positions and movement of a controller from an ahead or astern position to one of its reverse positions results in operation of common speed control means to an initial or off position, operation of port or starboard motor reversing means corresponding to the controller actuated, and operation of the said speed control means to a position dependent on the position of one of the controllers.

In carrying out the invention we prefer to provide in conjunction with port and starboard controllers adapted respectively to control the direction of rotation of the port and starboard motors, means whereby, when one controller is in a lower speed position than the other controller, speed control is effected by the former controller.

In one bridge or remote electric control arrangement applied to an electric ship propulsion system having motors which are respectively coupled to port and starboard propellers and which are arranged to be fed separately from different generators or from the same generator, speed control of a motor being effected by regulation of the excitation of a generator supplying the motor with power, the arrangement is such that when the motors are fed from different generators, port and starboard controllers respectively control the direction and speed of the port motor and the starboard motor, whilst when the motors are fed from the same generator, the port and starboard controllers respectively control the direction of the port motor and the direction of the starboard motor, whilst the speed is controlled by one of the controllers determined by the relative positioning of the two controllers.

The controller effective to exert the common speed control is selected by a relay that takes up one or other of two positions in dependence on which controller is in the lower speed position, for the purpose of thereby rendering the said controller effective to exert speed control.

The arrangement is such that when a controller adapted to exert common speed control is moved from one operative position to a reverse position, common speed control means are, before reversal of the motor the direction of which is controlled by the said controller, returned to an initial or off position under the joint control of contacts on the controller and contacts associated with the reversing means for the said motor.

Figure 2:
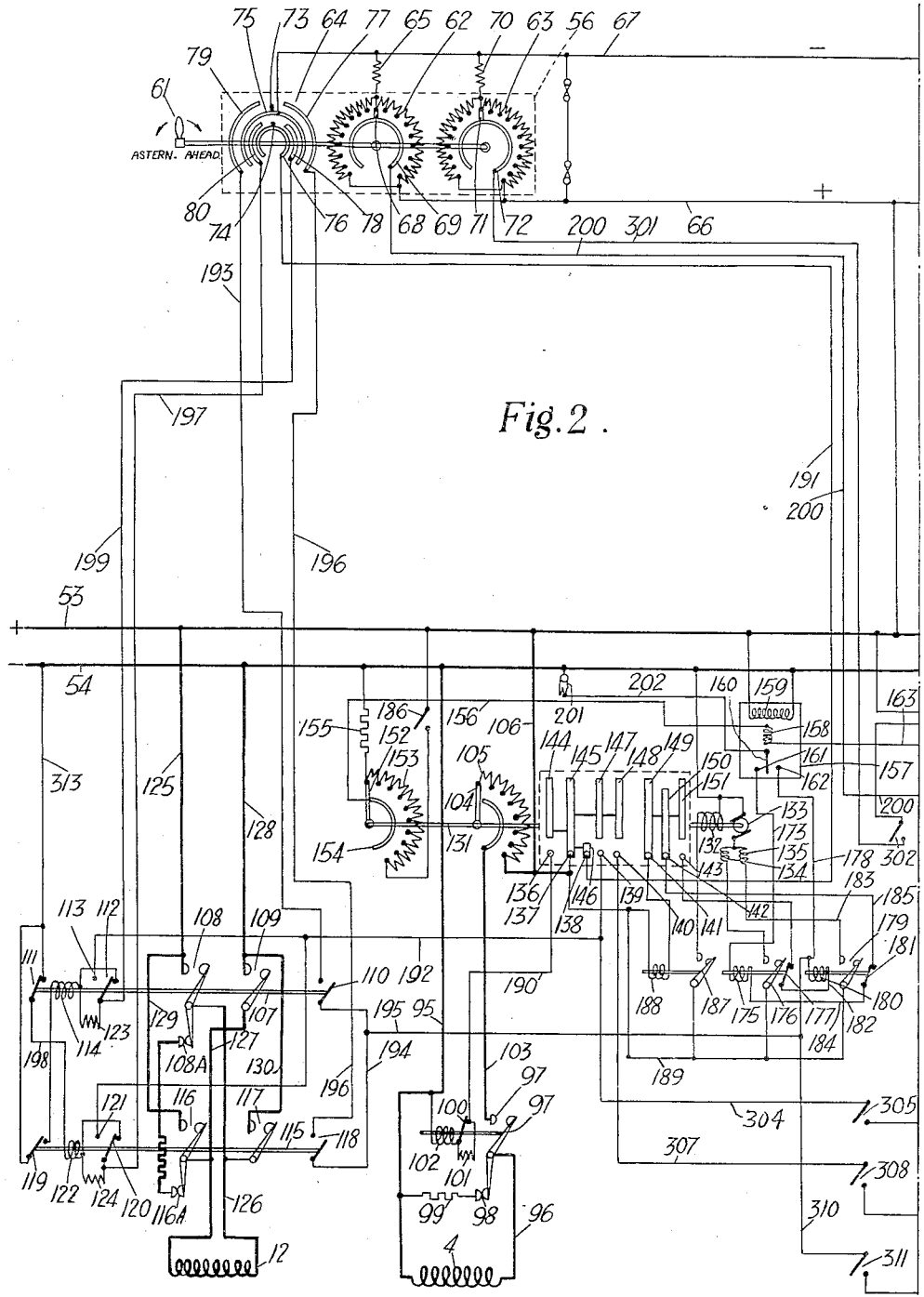
Figure 2A:
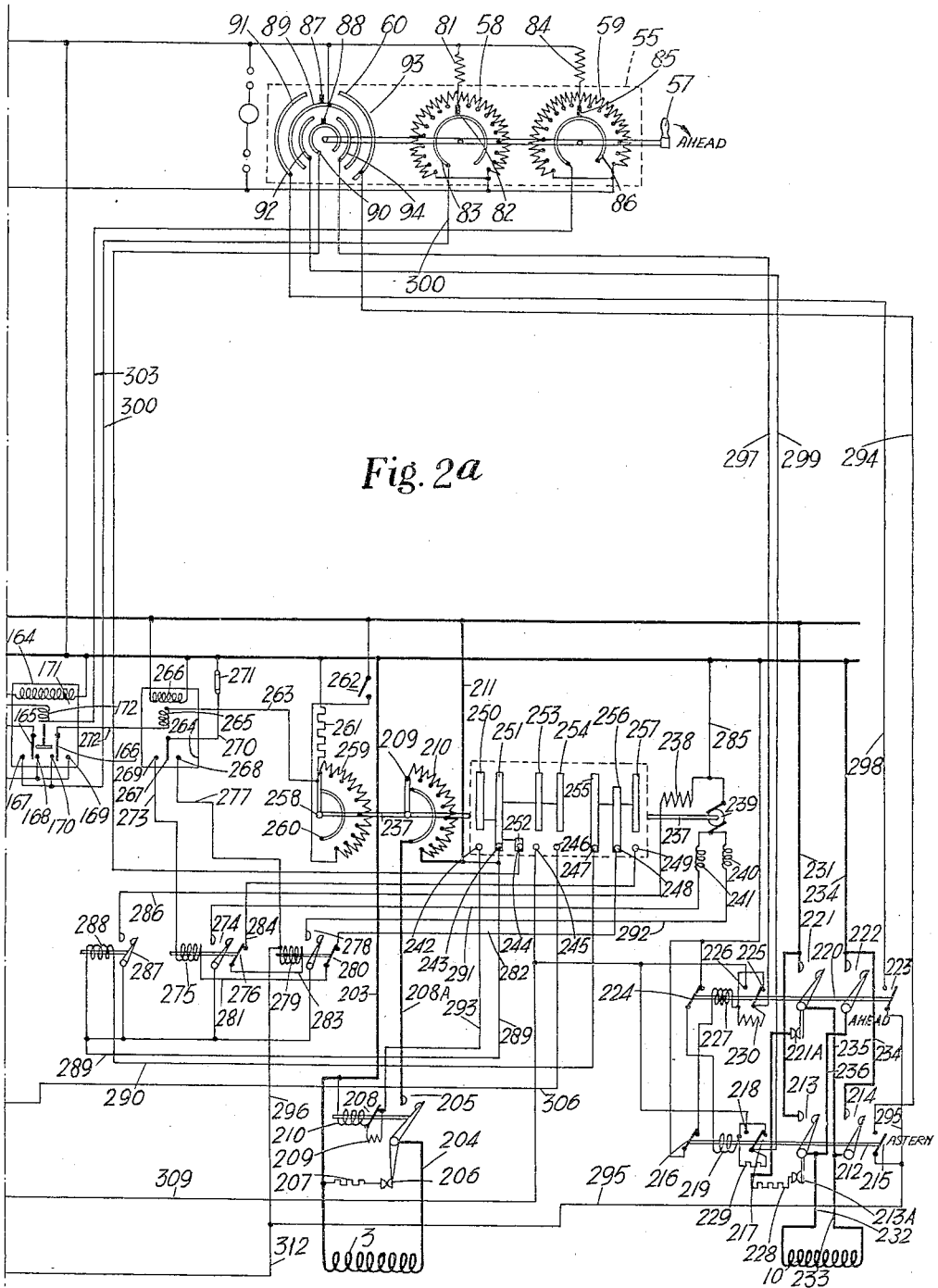

One arrangement in accordance with the invention, will now be described by way of example with reference to the accompanying diagrammatic drawings of which Figure 1 shows the propulsion current circuits for a twin screw Diesel electric vessel employing direct current motors and generators connected for speed control on the Ward-Leonard system together with auxiliary control circuit contacts on the switchgear, whilst Figure 2 shown on two sheets as Fig. 2 and Fig. 2a shows the control circuits therefor.

In the drawings, referring now to Figure 1, the port starboard D. C. generators 1, 2 having field windings 3, 4, are each driven by a separate Diesel engine 5, 6, which also drives two auxiliary generators 7, 8. The port propeller is driven by the port motor 9 having a field winding 10, whilst the starboard propeller is driven by the starboard motor 11 having a field winding 12.

Normally the port motor 9 is connected through links 13 and 14, over lines 15 and 16 through contacts 17, 18 of a four pole selector switch 33 (having in addition contacts 19, 20, 21, 22, 23 and 24) and over lines 25 and 26 with the port generator 1. Similarly the starboard motor 11 is normally connected through links 27 and 28, over lines 29, 30, contacts 21 and 22 of the four pole selector switch 33 and over lines 31, 32 with the starboard generator 2.

If however the four-pole selector switch 33 is moved to its other position in which circuits are adapted to be set up at contacts 19, 20, 23 and 24, a generator selector switch 34 is brought into operation, this switch also being a two-way four pole switch making in its left hand position (as shown) at contacts 35, 36, 37 and 38 and making in its right hand position at contacts 39, 40, 41 and 42. Assuming now that the four-pole selector switch 33 is in the right-hand position whilst the generator selector switch 34 is in the position shown, then it will be seen that a main current circuit is completed from the generator 2 over the line 31, contact 35 of the switch 34, line 43, contacts 22 of the two way selector switch 33, line 29, link 27, motor 11, link 28, line 30, contacts 24 of switch 33, line 44, contacts 36 of switch 34, line 45, contacts 37 of switch 34, line 46, contacts 19 of switch 33, line 15, link 13, motor 9, link 14, line 16, contacts 20 of switch 33, line 47, contacts 38 of switch 34 and lines 48 and 32 to the other side of the generator 2. It will thus be seen that both motors are then in series with the generator 2.

If the generator switch 34 is, however, in its right-hand position, the switch 33 also being in its right-hand position, it will now be seen that both port and starboard motors are in series with the port generator 1, since a circuit is then completed from one side of generator 1 over line 25, line 49, contact 39, line 43, contacts 23, line 29, link 27, motor 11, link 28, line 30, contact 24, line 44, contact 40, line 50, contact 41, line 46, contact 19, line 15, link 13, motor 9, link 14, line 16, contacts 20, line 47, contact 42, line 51 and line 26 to the other side of generator 1.

If at any time it is desired only to run one motor, the other may be put out of commission by a suitable repositioning of the links 13, 14, 27 and 28 as indicated by the interrupted lines.

The auxiliary generators 7 and 8 driven by the Diesel engines 5 and 6 respectively are alternatively arranged through a two way two pole switch 52 to energize positive and negative auxiliary supply bus-bars 53 and 54.

Referring now to Figure 2 in which are shown the diagrammatic control circuits, the port bridge controller 55 and the starboard bridge controller 56 are similar and each controller is similar, as regards its dial markings and its appearance, to an ordinary bridge telegraph. The port controller 55 comprises a handle 57 having an "off" position and "ahead" and "astern" positions, a speed potentiometer 58, a selector potentiometer 59 and a switching device 60. Similarly the starboard controller 56 comprises a handle 61 having an "off" position and "ahead" and "astern" positions, a speed potentiometer 62, a selector potentiometer 63 and a switching device 64.

Referring now to the starboard controller 56, the speed potentiometer 62 comprises two similar tapped resistances connected in parallel with one another and in series with a further resistance 65 across the auxiliary power supply bus-bars 66 and 67 connected to the supply busbars 53 and 54 respectively; the speed potentiometer 62 also comprises a rotary brush 68 which bridges tapping studs and a metal ring 69 and which in the "off" position of the controller connects the ring 69 with the ends of the resistances 62. The selector potentiometer 63 is similar and also comprises two similar tapped resistances 63, connected in parallel with each other and in series with a resistance 70 across the auxiliary supply busbars 66 and 67, and comprises a rotary brush 71 which bridges tapping studs of the resistance 63 and a metal ring 72 and in the "off" position of the controller connects the ring 72 with the ends of the resistances 63.

The switching device 64 comprises two rotary brushes 73 and 74 which connect segments 75 and 76 respectively to segments 77 and 78 in the "ahead" position and to segments 79 and 80 in the "astern" position of the controller handle 61.

In a similar manner, referring now to the port bridge controller 55, the speed potentiometer 58 comprises two similar tapped resistances 58 connected in parallel with one another and in series with a further resistance 81 across the auxiliary power supply busbars 66 and 67 connected to the supply busbars 53 and 54 respectively, the speed potentiometer 58 also comprises a rotary brush 82 which bridges tapping studs and a metal ring 83 and which in the "off" position of the controller connects the ring 83 with the ends of the resistances 58. The selector potentiometer 59 is similar and comprises two similar tapped resistances 59 connected in parallel with each other and in series with a resistance 84 connected across the auxiliary supply busbars 66 and 67 and comprises a rotary brush 85 which bridges tapping studs of the resistance 59 and a metal ring 86 and in the "off" position of the controller connects the ring 86 with the ends of the resistances 59. The switching device 60 associated with the port bridge controller 57 comprises two rotary brushes 87 and 88 which connect segments 89 and 90 respectively to segments 91 and 92 in the "astern" position and to segments 93 and 94 in the "ahead" position of the controller handle 57.

The starboard generator field 4 is connected on one side over a line 95 with the negative busbar 54 and on the other side over a line 96 to a field contactor 97 closing at contacts 97 and having auxiliary contacts 98 controlling a discharge resistance 99 and auxiliary contacts 100 controlling an economy resistance 101 in series with the contactor energizing winding 102. On closure of the field contactor 97, a circuit is completed through the generator field 4, over line 103 and through the contact arm 104 engaging tappings on a field resistance 105, one end of which is connected to the positive busbar 53 over the line 106. Variation of motor speed control is carried out in known manner by the variation in the excitation of the generator field.

The direction of rotation of the starboard motor is determined by the direction of current flow through the motor field winding 12. The current is supplied to the motor field winding 12 either through an "ahead" contactor 107 or through an "astern" contactor 115. The "ahead" contactor 107 has normally open main current contacts 108 and 109, normally closed main contacts 108A, normally open auxiliary contacts 110, normally closed auxiliary contacts 111, and changeover contacts 112, 113 of which contacts 112 are normally closed and, of course, contacts 113 are normally open. The "ahead" contactor 107 is closed by energization of its actuating winding 114. The "astern" contactor 115 is similar to the "ahead" contactor 107 and comprises normally open main contacts 116 and 117 normally closed main contacts 116A, normally open auxiliary contacts 118, normally closed auxiliary contacts 119 and changeover contacts 120, 121 of which contacts 120 are normally closed and contacts 121 are normally open. The "astern" contactor 115 is closed by energization of its actuating winding 122. The contacts 108A and 116A are connected through a discharge resistance.

On closing either of the contactors 107, 115 maintenance circuits are completed, for contactor 107 at contacts 113, through an economy resistance 123, and for contactor 115 at contacts 121 through an economy resistance 124.

If the "ahead" contactor 107 is closed, a circuit is completed from the positive busbar 53 over the line 125, through the contacts 108, over line 126, through the starboard motor field 12, over line 127, through contacts 109 and over line 128 to the negative busbar 54. It will be seen that when contactor 107 closes, owing to the contacts 111 opening, it is then impossible to complete the circuit of the "astern" contactor winding 122 and thus to close the "astern" contactor whilst the "ahead" contactor is closed. In a similar manner, when the "astern" contactor 115 is closed it is then impossible to make the circuit through the coil 114 of the "ahead" contactor, owing to the opening of the auxiliary 119 of the contactor 115. When the "astern" contactor 115 is closed a circuit is then completed from the positive busbar 53, over the line 125, over the line 129, through the contacts 116, through the motor field 12 in the opposite direction to that described above, over line 126, through the contacts 117, over line 130 and line 128 to the negative busbar 54.

The brush 104 of the field resistance 105 is carried on a shaft 131 which is arranged to be driven through the intermediary of an electromagnetic clutch having an operating winding 132, by a reversible electric motor 133 having separate field windings 134 and 135. The shaft 131 also drives a drum provided with eight contact fingers 136 to 143 which engage with complementary segments 144 to 151, and a brush 152 which connects tappings on a potentiometer 153 with a metal ring 154. The potentiometer is connected across the supply busbars 53, 54 in series with a resistance 155, through contacts 186 which are auxiliary contacts of the switches 33 and 34 (see Figure 1) and are only closed whilst the starboard generator is in commission.

The ring 154 is connected over a line 156 to one side of an operating coil 158 of a starboard reverse current relay 157 having a voltage coil 159 connected across the supply bus-bars 53 and 54 and having a moving contact 160 biassed to a central or open position but adapted in dependence on the direction of flow of current in the operating coil 158 to engage either a contact 161 or a contact 162. The moving contact 160 is connected over a line 202 and an overpower relay 201 to the negative bus 53. The other side of the operating coil 158 of the starboard reverse current relay 157 is connected over a line 163 with a movable contact member 165 of a selector relay 164 which includes two moving contact members 165 and 166, cooperating with contacts 167, 168 and 169, 170 respectively and normally each engaging the latter of these contacts i. e. contacts 168 and 170. The selector relay 164 includes a voltage coil 171 connected across the supply bus-bars 53 and 54 and an operating coil 172, the connections to which together with the operation of the selector relay 164, will be hereinafter described.

Reverting to the starboard reverse current relay 157, the contact 161 is connected by a line 173 to the coil 175 of a normally open contactor 176 controlling the circuit to the field winding 134 of the motor 133. The contactor 176 has associated therewith a pull-off auxiliary contact 177. The contact 162 of the starboard reverse current relay 157 is connected by a line 178 to one side of a coil 180 of a normally open contactor 179 controlling the circuit to the field winding 135 of the motor 133. The contactor 179 has associated therewith a pull-off auxiliary contact 181. The other side of the coil 180 is connected by a line 182 through the pull-off auxiliary contact 177 of the contactor 176, and a line 183 to the finger 143 of the drum switch. Similarly the other side of the contactor coil 175 is connected by a line 184 through the auxiliary contact 181 of the contactor 179 and over a line 185 the finger 142 of the drum switch. The segments 149, 150 and 151 of the drum switch which respectively cooperating with the fingers 141, 142 and 143 are connected together and act as limit switches to effect opening of the clutch contactor 187 the winding 188 of which is connected to finger 141 and the contactor 176 or the contactor 179 in the extreme positions of the generator field rheostat 105.

The finger 137 of the drum switch is connected to the positive bus 53 and by a line 189 to one side of the coil 188, the contacts 187, the contacts 176 and the contacts 179. The finger 136 of the drum switch is connected to the auxiliary contact 160 of the contactor 97 over a line 190 and serves to complete a maintenance circuit for the contactor 97. The finger 138 is connected by a line 191 to the metal ring 76 of the switching device 64; finger 139 is adapted over line 192 to effect a maintenance circuit for whichever of the direction contactors 107 or 115 is closed.

The "astern" segment 79 of the switching device 64 is connected by a lead 193 to one side of the auxiliary contacts 110, the other side of which contacts 110 is connected by a line 194 to one side of the auxiliary contacts 118, and by a line 195 to the line 178. The other side of the auxiliary contacts 118 is connected by a line 196 to the "ahead" segment 77 of the switching device 64. The "astern" segment 80 of the switching device 64 is connected by a line 197 through the coil 122 of the "astern" contactor 115 and by the line 198 and through the interlock contacts 111 on the "ahead" contactor 107 and line 313 to the negative bus-bar 54. The "ahead" segment 78 of the switching device 64 is connected by a line 199 through the economy resistance 123 and the coil 114 of the "ahead" contactor 107 and the interlock contacts 119 on the "astern" contactor 115 and line 313 to the negative bus-bar 54. The ring 75 on the switching device 64 is connected to the negative line 67.

The ring 69 of the speed potentiometer 62 is connected by a line 200 to the contacts 168 and 169 on the selector relay 164.

The arrangement of the control gear for the port motor and genereator is similar to that of the starboard control gear described above. The port generator field 3 is connected on one side over a line 203 with the negative bus-bar 54 and on the other side over a line 204 to a field contactor 205 closing at contacts 205 and having auxiliary contacts 206 controlling a discharge resistance 207 and auxiliary contacts 208 controlling an economy resistance 209 in series with the contactor winding 210. On closure of the field contactor 205, a circuit is completed through the generator field 3, over the line 203A and through a contact arm 209 engaging tappings on a generator field rheostat 210, one end of which is connected to the positive bus bar 53 via the line 211.

The direction of rotation of the port motor 9 is determined by the direction of current flow through the motor field winding 10. Current is supplied to the motor field winding 10 either through an "astern" contactor 212 or through an "ahead" contactor 220. The "astern" contactor 212 comprises normally open main current contacts 213, 214, normally closed main contacts 213A, normally open auxiliary contacts 215, normally closed auxiliary contacts 216 and changeover contacts 217 and 218, of which, changeover contacts 217 are normally closed and contacts 218 normally open. The "astern" contactor 212 is provided with an energizing winding 219.

The "ahead" contactor 220 is similar to the "astern" contactor and comprises normally open main contacts 221, 222, normally closed main contacts 221A, normally open auxiliary contacts 223, normally closed auxiliary contacts 224, and changeover contacts 225 and 226, of which contacts 225 are normally closed and contacts 226 are normally open. The "ahead" contactor also includes an actuating winding 227. The contacts 221A and 213A are connected through a discharge resistance 228.

On closing either of the direction contactors 212 or 220 maintenance circuits are completed, for contactor 212, at contacts 218 through an economy resistance 229 and for contactor 220 at contacts 226 through an economy resistance 230.

If the "astern" contactor 212 is closed, a circuit is completed from the positive bus-bar 53 over the line 231, through the contacts 213, over the line 232, through the "port" motor field 10, over the line 233, through the contacts 214 and over the line 234 to the negative bus-bar 54. It will be seen that when contactor 212 closes, owing to the opening of the contacts 216, it is then impossible to energize the coil 227 of the "ahead" direction contactor 220. In a similar manner, when the "ahead" contactor 220 is closed it is then impossible, owing to the opening of auxiliary contacts 224, to complete the circuit of the "astern" direction contactor 212. When the "ahead" contactor 220 is closed a circuit is completed from the positive bus 53 over the line 231, contacts 221, line 235, line 233, field winding 10, line 232, line 236, contacts 222 and line 234 to the negative bus bar 54.

The brush 209 of the generator field rheostat 210 is carried on a shaft 237, which is arranged to be driven through the intermediary of an electromagnetic clutch, the actuating winding 238 of which is only shown, by a reversible electric motor 239 having separate field windings 240 and 241. The shaft 237 also drives a drum switch comprising eight contact fingers 242 to 249 which engage with complementary segments 250 to 257. The segments 250, 251, 252, 253 and 254 are connected together as are the three segments 255, 256 and 257. The shaft 237 also drives a brush 258 which connects tappings on a potentiometer 259 with a metal ring 260. The potentiometer 259 is connected across the supply bus bar 53, 54 in series with a resistance 261, through contacts 262 which contacts 262 are auxiliary contacts of the switches 33 and 34 (see Figure 1) and are only closed whilst the port generator is in commission.

The ring 260 is connected over a line 263 to one side of an operating coil 265 of a port reverse current relay 264, having a voltage coil 266 connected across the supply bus-bars 53 and 54 and including a moving contact 267 biassed to a central or open position but adapted in dependence on the direction of flow of current in the operating coil 265 to engage either a contact 268 or a contact 269. The moving contact 267 is connected over a line 270 and an overpower relay 271 to the negative bus 53. The other side of the operating coil 265 is connected by a line 272 to the moving contact 168 of the selector relay 164.

The contact 269 of the port reverse current relay 264 is connected by a line 273 to the operating coil 275 of a contactor 274 having auxiliary normally closed contacts 276. The contact 268 of the port reverse current relay 264 is connected by a line 277 to the operating coil 279 of a contactor 278 having auxiliary normally closed contacts 280. The operating coil 275 of the contactor 274 is connected by a line 281 and through the interlock contact 280 on the contactor 278, and a line 282 with the finger 248 on the drum switch. The operating coil 279 of the contactor 278 is connected by a line 283 and through the interlock contact 276 on the contactor 274 and over a line 284, with the finger 249 on the drum switch.

The circuit of the clutch winding 238 is completed from the negative bus-bar 54 over the line 285, coil 238, line 286, contactor 287 having an actuating winding 288, over lines 289 and 211 to the positive bus-bar 53. One end of the coil 288 is connected to the line 289, the other end of the said coil is connected over line 290 with the finger 247 of the drum switch. The contactors 274 and 278 are respectively connected over lines 291 and 292 with the field windings 241 and 240 of the motor 239. It will thus be seen that the segments 255, 256 and 257 and the cooperating fingers 247, 248 and 249 thus act as limit switches to effect opening of the clutch contactor 287 or one of the contactors 274 278 in the extreme positions of the generator field rheostat 209.

Of the remaining fingers on the drum switch, the finger 243 is connected to the positive bus 54, the finger 242 is connected over a line 293 to make a maintenance circuit for the generator field contactor 205. The "ahead" segment 93 of the selector switch 60 is connected by a line 294 through the interlock contact 215 on the "astern" contactor to a line 295 and to a line 296 connected to one side of the coil 279 of the contactor 280. The "ahead" segment 94 is connected by a line 297 to one side of the operating coil 227 of the "ahead" direction contactor 220. The "astern" segment 91 of the selector switch 60 is connected through a line 298 and the interlock 223 to the line 295. The other "astern" segment 92 is connected through a line 299 to one side of the "astern" contactor closing coil 219. The ring 89 of the selector switch 60 is connected to the negative supply line 67 whilst the ring 83 of the speed potentiometer is connected over a line 300 with the contacts 167 and 170 of the selector relay 164.

The ring 72 of the "starboard" side selector potentiometer is adapted over a line 301 and contacts 302, coil 172 and line 303 and coil 165 of relay 164 to be connected to the ring 86 of the "port" side selector potentiometer 59. The contacts 302 are auxiliary contacts of the selector switch 33 (see Figure 1) and are only closed when the switch 33 is in its right-hand position, i. e. when both port and starboard motors are running off one generator either the port or the starboard generator. Moreover the finger 139 on the starboard drum controller is adapted to be connected over a line 304 on closure of contacts 305 and over line 309 with the finger 246 on the port drum controller. The contacts 305 (see Figure 1) are only closed when both motors are running on the port generator, the starboard generator being out of commission.

The finger 140 on the starboard drum controller is adapted to be connected over line 307 contacts 308 and line 309 with the finger 245 on the port drum controller. The contacts 308 (see Figure 1) are only closed when both motors are connected to the starboard generator, the port generator being out of commission. Finally there is a connection between line 195 connected to one side of the "lower" contactor coil 180 and the side of the "lower" contactor coil 279 over the lines 310, contacts 311 and lines 312 and 296. The contacts 311 are only closed as are the contacts 308 when both the "port" and "starboard" motors are running off the "starboard" generator 2.

In order now that the invention may more clearly be understood there will now be described the general operation of the arrangement shown. If now the selector switches 33 and 34 are in the position shown in Figure 1, the "starboard" motor is then connected to the "starboard" generator and the "port" motor is connected to the "port" generator, then the control of each one side is entirely independent of the control of the other side and is effected by the bridge controller in a manner hereinafter described.

On the other hand, suppose that both port and starboard motors are connected to one generator, for example, the port generator. It is then arranged that the port and starboard controllers respectively control the direction of the port motor and the direction of the starboard motor, whilst the speed is controlled by one only of the controllers, which controller is determined by the relative positioning of the two controllers.

The controller effective to exert the common speed control is selected by a relay that takes up one or other of two positions in dependence on which controller is in the lower speed position, for the purpose of thereby rendering the said controller effective to exert speed control.

The arrangement is such that when a controller adapted to exert common speed control is moved from one operative position to a reverse operative position, the common speed means are, before reversal of the motor the direction of which is controlled by the said controller, returned to an initial or off position under the joint control of contacts on the controller and contacts associated with the reversing means for the motor.

The detailed operation will now be described. It is assumed now that both the "port" and "starboard" bridge controllers are initially in their "off" position and that both the Diesel engines 5 and 6 are running at constant speed. The actual control of these engines may of course be any desired, and of course the generator output may additionally be controlled by speed control of the associated Diesel engines.

If now the selector switches 33 and 34 are in the position shown in Figure 1, then the "starboard" motor is running from "starboard" generator and the "port" motor is running from "port" generator. The operation will therefore only be described with reference to the "starboard" equipment, it being understood that in these circumstances the operation of "port" and "starboard" equipment is exactly similar.

Suppose now the starboard controller handle 61 is moved to an "ahead" position, then a circuit is completed from the positive bus-bar 53, over line 106, finger 137, segment 145, segment 146, finger 138, line 191, ring 76 of selector switch 64, brush 74, ring 73, line 199, coil 114 of "ahead" contactor 107, interlock contact 119 of "astern" contactor 115 and line 313 to the negative bus-bar 54. The "ahead" contactor 107 accordingly closes completing the field circuit of the associated motor and preparing a retaining circuit for itself at the contact 113 through the economy resistance 123. Owing to the dissimilar positions of the brush 68 on the potentiometer 62 and the brush 152 on the follow-up speed potentiometer 153, a current flows through the reverse current relay 157 from the negative bus 66, through a part of the potentiometer winding 62, brush 68, ring 69, line 200, normally closed contact 168 and contact member 165 of selector relay 164, line 163, coil 158 of reverse current relay 157, line 156, ring 154, brush 152, part of the potentiometer winding 153, contacts 186 to the positive bus 53. The reverse current relay 157 accordingly closes at contact 161. A circuit is then completed from the negative bus 54, through the overpower relay 201, over line 202, contact 161, line 173 coil 175 of the "raise" contactor 176, interlock contacts 181 on the "lower" contactor 179, line 135, finger 142, segments 150 and 149, finger 141, contactor coil 188 to the positive bus-bar 53. The raise contactor 176 accordingly closes and thus completes a circuit from the negative bus 54, through the motor 133 and "raise" winding 134, contactor 176, lines 189 and 106 to the positive bus 53. The motor 133 is thus set in rotation; the clutch coil 132 is moreover energized owing to the closing of the clutch contactor 187. The motor 133 therefore drives the shaft 131 in such a direction as to decrease the difference of potential between the speed potentiometer 62 and the follow-up potentiometer 152. At the same time the brush 104 is moved over the generator field rheostat 105 and the segments of the drum switch rotated. Just prior to the disengagement of segment 146, and finger 138, the segment 147 engages the finger 139 and accordingly, through 192, completes the maintenance circuit for the "ahead" contactor 107.

The segment 144 also engages its associated finger 136 and thus completes the circuit to the coil 102 of the generator field contactor 97 from the positive bus 53, over the line 106, finger 137, segments 145 and 144, finger 136, line 193, normally closed contacts 100 on the field contactor 97, coil 102 and line 95 to the negative bus 54. The field contactor 97 then closes, the motor 11 accordingly starts, the speed control thereof thereafter being controlled in known manner by variation of the generator field excitation.

The generator field excitation is controlled by the moving brush 104 mounted on the shaft 131. This shaft is rotated until the arm 152 moving therewith reaches such a position that there is equality between the potential of the arm 152 and the brush 68 whereupon the current flow through the coil 158 of the reverse current relay 157 ceases. The moving contact of this relay 157 then moves to its central position and disengages the contact 161. The raised contactor 176 then drops open and causes both the interruption of the circuit to the motor 133 and the dropping out of the clutch contactor 187. The shaft 131 and the generator rheostat brush 104 is therefore arrested in a position corresponding exactly to the "speed" position of the starboard controller handle 61.

If now the controller handle 61 is moved back towards the "off" position, the balance of the reverse current relay 157 is upset and contact is made at contacts 162. The "lower" contactor 179 is accordingly energized and the clutch 132 engaged, the motor 133 then moves the shaft 131 and the parts connected therewith until the balance at relay 157 is again restored, the shaft 131 is then arrested, the rheostat 105 then being in the new speed setting determined by the position of the handle 61.

If the handle 61 is moved from an "ahead" position past the "off" position to an "astern" position, a circuit is then completed from the negative bus 67 through the ring 75, brush 73, ring 79, line 193, contacts 110, line 195, the coil 180 of the "lower" contactor 179 and as before which circuit is not interrupted until the drum etc. has been moved back into the initial "off" position, in which position only is the maintenance circuit for the "ahead" contactor 107 broken, the circuits are then made for the closing of the "astern" contactor 115 which closes, the motor 133 is then again energized to move the follow up speed potentiometer brush 152 and, of course, the rheostat brush 104 to a position corresponding to that of the new "astern" speed setting of the controller handle 61.

The port controller and associated apparatus, of course, operate in exactly the same way.

If on the other hand, instead of the starboard motor being connected to the "starboard" generator and the "port" motor being connected to the port generator, the switch 33 is in its right hand position, the auxiliary contact 302 will be closed and both the "port" and "starboard" motors will be connected to the "starboard" generator. The auxiliary switches 262 will then be open, so that the "port" potentiometer follow up gear will be deenergized. The closure of the switch 302 connects together the two brushes 71, 85 of the selector potentiometers 63, 59 respectively. If now these two brushes are in dissimilar positions, current flows in the operating coil 172 of the selector relay 164 in a direction dependent on which controller is in a lower speed position. The arrangement is such that if the port controller 55 is in the lower speed position, then both the operating coil 158 of the starboard reverse current relay 159 and the operating coil 265 of the port reverse current relay 264 are connected through the contacts 167 and 170 of the selector relay 164 to the port speed potentiometer 58 and the pilot motor 133 of the starboard generator is subject to control by the port master controller 55. Similarly if the starboard controller 56 is in the lower speed position, then both the operating coil 265 of the port reverse current relay 264 and the operating coil 158 of the starboard reverse current relay 157 are connected through contacts 165 and 169 of the selector relay 164 to the starboard speed potentiometer 62 and the pilot motor 133 of the starboard generator is subject to control by the starboard master controller 56.

The action is similar if both motors are connected to the port generator by the operation of the switches 33 and 34. The selector switches are of course operated when the generator field rheostats are in their off positions. When the port generator 1 is rendered ineffective by the selector switches 33 and 34, auxiliary contacts 262 of the latter switch 34 disconnect the port follow up speed potentiometer 259 from the auxiliary power supply bus 54, with the result that the port reverse current relay 264 is inoperative and the port drum and generator field rheostat 210 during operation of the starboard generator 2 remain in the "off" position. Similarly when the starboard generator 2 is rendered ineffective, auxiliary contacts 186 of the selector switches 33 and 34 cause the starboard drum and generator field rheostat 105 during operation of the port generator 1 to remain in the off position.

Of the three other selector switch auxiliary contacts 305, 308 and 311 that close when the selector switches are operated to connect both motors to the same generator, auxiliary selector switch contact 305 serves to transfer control of the starboard direction contactor 107, maintaining circuit over the line 192 from the starboard drum to the port drum, when the starboard generator is not in use; auxiliary selector switch contact 308 serves to transfer control of the port direction contactor maintaining circuit over the line 309 from the port drum to the starboard drum, when the port generator is not in use; and contacts 311, when the port generator 1 is not in use and the port controller 55 is turned from one operative position to a reverse position, renders the switching device 60 of the port controller 55 and a port reversing contactor "off" auxiliary contact 223 or 215 effective in causing energization of the coil of the starboard lower contactor 179, until the starboard drum is in the "off" position, or which, when the starboard generator 2 is not in use and the starboard controller 56 is turned from one operative position to a reverse position renders the switching device 64 of the starboard controller 56 and a starboard reversing contactor "off" auxiliary contact 110 or 118 effective in causing energization of the coil 279 of the port lower contactor 279 until the port drum is in the "off" position.

The operation is similar whether the port generator or the starboard generator is not in use and it will be sufficient to consider the case in which the selector switches 33 and 34 have been operated to connect both motors to the starboard generator.

In such case if both controllers 55 and 56, say, are turned from their "off" positions in one direction, for instance the "ahead" direction, then, if the positions of controllers 55 and 56 exactly correspond, no current flows in the operating coil 172 of the selector relay 164, the port controller 55 is ineffective to exert speed control but operation of the starboard pilot motor 133 is effected under the control of the starboard controller 56 in the manner described above.

If the starboard controller 56 is turned to a lower speed position than the port controller 55, energization of the operating coil 171 of the selector relay 164 results in connection of the operating coil 265 of the port reverse current relay 264 to the starboard speed potentiometer 62, but without effect, the control of the starboard motor 133 still being effected by the starboard controller 56. If, however, the port controller 55 is turned to a lower speed position than the starboard controller 56, energization of the operating coil 172 of the selector relay 164 results in disconnection of the operating coil 158 of the starboard reverse current relay 157 from the starboard speed potentiometer 62 and connection of the said coil to the port speed potentiometer 58, with the result that the starboard pilot motor 133 is for the time being controlled by the port controller 55.

In any case the starboard controller 56 controls closure of the starboard direction contactors and the port controller controls closure of the port direction contactors. However, when the "ahead" port direction contactor 220 has closed, the circuit of its coil 227 is maintained through the first and fifth segments 144 and 148 of the starboard drum controller and the auxiliary selector switch contact 308.

If now the starboard controller 56, say, is turned to an "astern" position the starboard pilot motor 133 is operated to the "off" position under control of the "astern" segment 79 of the switching device 64 of the controller 56 and the auxiliary contact 118 of the starboard "ahead" reversing contactor 197, and the starboard reversing contactors operate in the manner already described. Upon opening of the starboard "lower" contactor 179, the starboard "raise" contactor 176 closes until the starboard generator field rheostat 105 reaches the position corresponding to that of the controller which is in the lower speed position.

If the port controller 55 is turned to the astern position the operation is a little different. As before the circuit of the coil 227 of the port "ahead" reversing contactor 220 is maintained through the fifth segment 148 of the starboard drum and the auxiliary selector switch contact 308, until the starboard drum reaches the "off" position. The closure of the starboard "lower" contactor 179, however, is brought about by energization of its coil 180 through closure of a circuit including the astern segment 91 of the switching device 60 of the port controller 55, the auxiliary contact 223 of the port "ahead" reversing contactor 220 and the auxiliary selector switch contact 311.

When the starboard drum reaches the "off" position, the port reversing contactors are operated, and, upon opening of the starboard "lower" contactor 179, that controller which is in the lower speed position becomes effective in controlling movement of the starboard generator field rheostat 105 to a corresponding position.

In one arrangement, a multi-pole transfer switch may be provided for transferring control from the bridge to the engine room and in the engine room may be provided port and starboard reversers and port and starboard speed controllers that exert direct control of the "raise" and "lower" contactors in a similar manner to the bridge controllers.

The arrangement has been described in connection with two motors and two generators, but naturally it may be applied to a system in which there are more than two motors or/and more than two generators. The prime movers may be of any desired type, the auxiliary excitation supply may be derived in some manner other than that described, for example from a separate prime mover and generator set.

Also the arrangement may be applied to an alternating current propulsion system in which speed control is effected by control of the speed of the turbine or other prime mover driving a generator. It may, for instance, be used in connection with the control arrangement described in our British patent specification No. 352,615 which relates to an alternating current system wherein the alternator speed and excitation are both varied.

In some instances it is possible to connect a port motor with a starboard generator and a starboard generator with a port motor. When such is the case it will be necessary to provide auxiliary contacts on the selector switches for suitably changing over the connections so that the port controller shall always control the port motor or motors and the starboard controller shall always control the starboard motor or motors.

I claim:—

1. A control system for an electric ship propulsion system which includes port and starboard electric propulsion motors and a plurality of electric generators, comprising electrical connections and selective switching means adapted to connect the said motors separately to different generators or to the same generator, a plurality of regulating means adapted to control the output of the respective generators for the purpose of effecting motor speed control, a plurality of reversing means respectively associated with the motors and adapted by control of the motor connections to effect reversal of the motors, port and starboard controllers adapted respectively to control the reversing means of the port and starboard motors and when the port and starboard motors are operatively associated with different generators, separately to control the regulating means of the generators respectively operatively associated with the port and starboard motors, together with means associated with selective switching means whereby when the port and starboard motors are operatively associated with one generator either controller is adapted to exert control of the output of the said generator and selector means arranged to be influenced by the relative positioning of the port and starboard controllers and to exert a control to determine which of the controllers is effective to control the output of the generator.

2. A control system for an electric ship propulsion system which includes port and starboard electric propulsion motors and a plurality of electric generators, comprising electrical connections and selective switching means adapted to connect the said motors separately to different generators or to the same generator, a plurality of regulating means adapted to control the outputs of the respective generators for the purpose of effecting motor speed control, a plurality of reversing means respectively associated with the motors and adapted by control of the motor connections to effect reversal of the motors, port and starboard controllers adapted respectively to control the reversing means of the port and starboard motors and when the port and starboard motors are operatively associated with different generators separately to control the regulating means of the generators respectively operatively associated with the port and starboard motors, together with means associated with selective switching means whereby when the port and starboard motors are operatively associated with one generator either controller is adapted to exert control of the output of the said generator and selector means arranged to be influenced by the relative positioning of the port and starboard controllers and to exert a control to determine which of the controllers is effective to control the output of the generator, at least until the said generator output control means has moved to an initial position.

3. A control system for an electric ship propulsion system which includes port and starboard electric propulsion motors and a plurality of electric generators, comprising electrical connections and selective switching means adapted to connect the said motors separately to different generators or to the same generator, a plurality of regulating means adapted to control the outputs of the respective generators for the purpose of effecting motor speed control, a plurality of reversing means respectively associated with the motors and adapted by control of the motor connections to effect reversal of the motors, port and starboard controllers adapted respectively to control the reversing means of the port and starboard motors and when the port and starboard motors are operatively associated with different generators separately to control the regulating means of the generators respectively operatively associated with the port and starboard motors, together with means associated with selective switching means whereby when the port and starboard motors are operatively associated with one generator either controller is adapted to exert control of the output of the said generator and selector relay means, said selector relay means comprising an operating winding and said means having two operative positions and being arranged to be influenced by the relative positioning of the port and starboard controllers to move to one of said positions to determine which of the controllers is effective to control the output of the generator.

4. A control system for an electric ship propulsion system which includes port and starboard propulsion motors and a plurality of electric generators, comprising electrical connections and selective switching means adapted to connect the said motors separately to different generators or to the same generator, a plurality of regulating means adapted to control the outputs of the respective generators for the purpose of effecting motor speed control, a plurality of reversing means respectively associated with the motors and adapted by control of the motor connections to effect reversal of the motors, port and starboard controllers adapted respectively to control the reversing means of the port and starboard motors and when the port and starboard motors are operatively associated with different generators separately to control the regulating means of the generators respectively operatively associated with the port and starboard motors, together with means associated with selective switching means whereby when the port and starboard motors are operatively associated with one generator either controller is adapted to exert control of the output of the said generator, selector relay means, said selector relay means comprising an operating winding and said means having two operative positions and being arranged to be influenced by the relative positioning of the port and starboard controllers to move to one of said positions to determine which of the controllers is effective to control the output of the generator, means responsive both to a state of said lower controller and to a state of the means controlling the reversing of the said motor with which said controller is associated, said latter responsive means being arranged to ensure that on movement of said controller from one operative position to a reverse position, the said generator output control means is moved to said initial position before said motor reversing means operate to reverse said motor.

5. A control system for an electric ship propulsion system which includes port and starboard electric propulsion motors and a plurality of electric generators, comprising electrical connections and selective switching means adapted to connect the said motors separately to different generators or to the same generator, a plurality of regulating means adapted to control the outputs of the respective generators for the purpose of effecting motor speed control, a plurality of reversing means respectively associated with the motors and adapted by control of the motor connections to effect reversal of the motors, port and starboard controllers adapted respectively to control the reversing means of the port and starboard motors and when the port and starboard motors are operatively associated with different generators separately to control the regulating means of the generators respectively operatively associated with the port and starboard motors, together with means associated with selective switching means whereby when the port and starboard motors are operatively associated with one generator either controller is adapted to exert control of the output of the said generator, selector relay means, said selector relay means comprising an operating winding and said means having two operative positions and being arranged to be influenced by the relative positioning of the port and starboard controllers to move to one of said positions to determine which of the controllers is effective to control the output of the generator, each of said controllers comprising a speed setting potentiometer, a selector potentiometer and a direction switching means, each of said speed setting potentiometers operating respectively to determine the setting of said regulating means controlling the output of the associated generator, and selector means arranged to be influenced by the relative positioning of the port and starboard controllers and to exert a control to determine which of the controllers is effective to control the output of the generator, said selector potentiometers in said controllers being arranged to be connected through said winding of said selector relay to effect movement of said selector relay means to an operative position and said direction switching means in said controllers effecting control of said motor field excitation circuits.

6. In an electric ship propulsion system, having motors for driving starboard and port propellers, starboard and port generators for delivering current for operating the respective motors, controllers having ahead and astern sections, means controlled by said controllers for determining the direction of rotation of the respective motors, means controlled by said controllers for varying the speed of the motors by varying the current delivered by the respective generators and means for automatically switching control of the current delivered by the generators from one controller to the other when the positions of the respective controllers are different.

7. In an electric ship propulsion system, having motors for driving starboard and port propellers, a corresponding number of generators for delivering current for operating said motors, selector switches for connecting said motors for operation from the corresponding or from one or the other of said generators, controllers having ahead and astern sections for controlling the respective motors, means controlled by said controllers for varying the amount of current delivered by the respective generators and automatic means for switching control of said last named means from one controller to another when the motors are operated from one or another of the generators.

8. In an electric ship propulsion system, having motors for driving starboard and port propellers, corresponding generators for delivering current for operating the respective motors, means for controlling the current delivered by the respective generators to thereby control the speed of the motors, controllers having ahead and astern sections for controlling the direction of rotation of the motors, a selector relay for determining speed control, means controlled jointly by and according to the position of said controllers for operating said selector relay, starboard and port reverse current relays, the operation of which is determined by said selector relay and means controlled by the respective controllers for operating the corresponding reverse current relays according to operation of said selector relay.

HEERBERT JOHN COATES.